(12) United States Patent
Weinberger et al.

(10) Patent No.: US 11,159,542 B2
(45) Date of Patent: Oct. 26, 2021

(54) CLOUD VIEW DETECTION OF VIRTUAL MACHINE BRUTE FORCE ATTACKS

(71) Applicant: MICROSOFT TECHNOLOGY LICENSING, LLC, Redmond, WA (US)

(72) Inventors: Tomer Weinberger, Tel Aviv (IL); Tomer Koren, Tel Aviv (IL); Hani Hana Neuvirth, Redmond, WA (US); Omer Karin, Tel Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 330 days.

(21) Appl. No.: 16/361,077

(22) Filed: Mar. 21, 2019

(65) Prior Publication Data

US 2020/0304524 A1    Sep. 24, 2020

(51) Int. Cl.
*H04L 29/06* (2006.01)
(52) U.S. Cl.
CPC ...... *H04L 63/1416* (2013.01); *H04L 63/1425* (2013.01); *H04L 63/1466* (2013.01)
(58) Field of Classification Search
CPC ............. H04L 63/1416; H04L 63/1425; H04L 63/1466; H04L 63/104
USPC .......................................................... 726/23
See application file for complete search history.

(56) References Cited

U.S. PATENT DOCUMENTS

| | | | |
|---|---|---|---|
| 9,736,147 B1* | 8/2017 | Mead .................... | H04L 9/3239 |
| 2007/0056038 A1* | 3/2007 | Lok ..................... | H04L 63/1416 726/23 |
| 2011/0016525 A1* | 1/2011 | Jeong .................. | H04L 63/1425 726/23 |
| 2015/0350193 A1* | 12/2015 | Honda ................ | H04L 63/1416 726/8 |
| 2016/0036838 A1* | 2/2016 | Jain ..................... | H04L 63/1416 726/23 |
| 2017/0078322 A1* | 3/2017 | Seiver .................... | H04L 41/12 |
| 2017/0302691 A1* | 10/2017 | Singh .................. | H04L 63/1408 |

(Continued)

FOREIGN PATENT DOCUMENTS

WO    2018099206 A1    6/2018

OTHER PUBLICATIONS

"International Search Report & Written Opinion issued in PCT Application No. PCT/US20/015986", dated May 15, 2020, 11 Pages.

*Primary Examiner* — Badrinarayanan Champakesan
(74) *Attorney, Agent, or Firm* — Workman Nydegger (57) ABSTRACT

A method for detecting machine logon attacks within a cloud service. The method can include accessing a collection of network traffic protocol monitoring data. The network traffic protocol monitoring data can be network traffic protocol monitoring data across a cloud service. The method can also include analyzing the collection of network traffic protocol monitoring data to identify anomalous behavior by attacker entities associated with IP addresses indicating a brute force attack by the attacker entities associated with the IP addresses. Then, based on the anomalous behavior, the method can comprise identifying the IP addresses associated with the attacker entities, and at least one of attack patterns or campaign attack characteristics. Finally, the method can include compiling IP addresses associated with the attacker entities and the at least one of attack patterns or campaign attack characteristics into a reference data structure.

20 Claims, 4 Drawing Sheets

(56) References Cited

U.S. PATENT DOCUMENTS

| | | | |
|---|---|---|---|
| 2018/0157835 A1* | 6/2018 | Nos | G06F 21/554 |
| 2018/0295149 A1 | 10/2018 | Gazit et al. | |
| 2019/0020686 A1* | 1/2019 | Cohen | H04L 63/20 |
| 2019/0052652 A1* | 2/2019 | Takahashi | H04L 63/1491 |
| 2019/0068627 A1* | 2/2019 | Thampy | H04L 63/1416 |
| 2019/0098037 A1* | 3/2019 | Shenoy, Jr. | H04W 12/12 |
| 2019/0182274 A1* | 6/2019 | Doron | G06N 3/04 |
| 2019/0318100 A1* | 10/2019 | Bhatia | H04L 63/1425 |
| 2020/0014713 A1* | 1/2020 | Paul | H04L 41/20 |
| 2020/0186569 A1* | 6/2020 | Milazzo | H04L 63/1416 |
| 2020/0293684 A1* | 9/2020 | Harris | G06F 21/45 |
| 2020/0296117 A1* | 9/2020 | Karpovsky | H04L 63/1483 |

\* cited by examiner

CLOUD VIEW DETECTION OF VIRTUAL MACHINE BRUTE FORCE ATTACKS

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems' ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

Interconnection of computing systems has facilitated distributed computing systems, such as so-called "cloud" computing systems. In this description, "cloud computing" may be systems or resources for enabling ubiquitous, convenient, on-demand network access to a shared pool of configurable computing resources (e.g., networks, servers, storage, applications, services, etc.) that can be provisioned and released with reduced management effort or service provider interaction. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

One of the longest-standing and most common challenges to information security teams is the brute force attack on computer systems, including cloud provided computer systems, including physical machines as well as virtual machines (VMs). In a brute force attack, an attacker entity iteratively attempts to access computer systems using a trial and error methods such as by attempting to "guess" usernames and/or passwords of the computer systems. Often, these types of attacks are performed more efficiently by using previously known information. An attacker may use various lists and/or dictionaries. For example, an attacker may use a list of known common passwords. Alternatively, or additionally, an attacker may use a dictionary of known or probable usernames. Alternatively, or additionally, an attacker may use an actual dictionary and use words from the dictionary to attempt to guess usernames and/or passwords.

Although this form of attack has been around for many years, it remains one of the most popular and widely used password-cracking methods. In terms of impact, brute force attacks are a threat capable of affecting millions of accounts. If these attacks are not detected and addressed in a timely manner they can lead to theft of intellectual property and personally identifiable information, significant financial losses, and irreversible damage to a business's reputation. Since most of cloud-hosted virtual machines require login accesses, such as secure shell (SSH) or remote desktop protocol (RDP) login accesses, such attacks are a major security concern for cloud users.

In cloud systems, brute force attacks may be distributed both in terms of attackers and targets. For example, often multiple attackers direct attacks at one or more targets. Alternatively, or additionally, a single attacker may attack multiple different targets. This distributed nature of attackers and targets results in some difficulty identifying verifiable attacks. Today, at any given moment there are thousands of active brute force attacks. Most of them end in failure, which are simply considered to be "white noise".

Although there are many detection solutions, they support only a subset of attack permutation due their limitation in gathering all necessary data, which leaves the user exposed. For example, tenants of a cloud-based system have access to their tenancy data which they can attempt to use to identify brute force attacks. However, a particular attacker may attack a particular target tenant so infrequently that attacks are difficult to identify. Further still, successful attacks may appear simply as ordinary logon attempts by authorized users. Thus, an attack may be successful, and due to the limited amount of data available to a tenant of a cloud-based system, the tenant would not be able to identify that the attack had been successful.

Thus, one of the main motivations of brute force detection, is the ability to catch a successful attack. To do so, a defender must have virtual machine event logs for a virtual machine accesses to virtual machines on the cloud service. A particular tenant can increase the amount of log data available by accessing logs for multiple virtual machines that exist as part of a tenancy of a cloud service. However, often, that is not enough. As noted previously, in many attacks, the source is distributed both in terms of variety of machines attacking and being attacked. Therefore, a particular virtual machine may not be aware of a wide spread attack due to minimal connection attempts to the virtual machine from a single source, even though that particular source is attempting a wide-spread attack against multiple other machines.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments illustrated herein implement a new cloud view detection approach for physical machine and virtual machine brute force attacks. Because cloud service providers can access data from all machines and tenants within cloud service, they have a unique advantage in detecting brute force attacks that may otherwise be undetectable by individual machines and tenants. Embodiments enable this broad cloud view by comparing individual machine security logs with overall network traffic topology mapping.

For example, one embodiment illustrated herein includes a method that may be practiced to detect machine logon attacks within a cloud service. The method includes accessing a collection of network traffic protocol monitoring data. The network traffic protocol monitoring data can be network traffic protocol monitoring data across a cloud service. The method can also include analyzing the collection of network traffic protocol monitoring data to identify anomalous behavior by attacker entities associated with IP addresses indicating a brute force attack by the attacker entities associated with the IP addresses. Then, based on the anomalous behavior, the method comprises identifying the IP addresses associated with the attacker entities, and at least one of attack patterns or campaign attack characteristics. Finally, the method can include compiling IP addresses associated with the attacker entities and the at least one of attack patterns or campaign attack characteristics into a reference data structure. Further, one embodiment illustrated herein comprises a computerized method for use with a computer system comprising one or more processors and one or more computer-readable media having stored thereon executable instructions that when executed by the one or more processors configure the computer system detect machine logon attacks within a cloud service. The method includes accessing a collection of network traffic protocol monitoring data. The method can further comprise analyzing the collection of network traffic protocol monitoring data to identify anomalous behavior by attacker entities associated with IP addresses indicating a brute force attack by the attacker entities associated with the IP addresses. Then, based on the anomalous behavior, the method comprises identifying the IP addresses associated with the attacker entities, and at least one of attack patterns or campaign attack characteristics. The method can include compiling IP addresses associated with the attacker entities and the at least one of attack patterns or campaign attack characteristics into a reference data structure.

Finally, one embodiment illustrated herein comprises a computer program product comprising one or more computer storage media having stored thereon computer-executable instructions that, when executed at a processor, cause the computer system to perform a method for to detecting machine logon attacks within a cloud service. The method includes accessing a collection of network traffic protocol monitoring data. The method can also include analyzing the collection of network traffic protocol monitoring data to identify anomalous behavior by attacker entities associated with IP addresses indicating a brute force attack by the attacker entities associated with the IP addresses. Next, based on the anomalous behavior, the method comprises identifying the IP addresses associated with the attacker entities, and at least one of attack patterns or campaign attack characteristics. The method can also include compiling IP addresses associated with the attacker entities and the at least one of attack patterns or campaign attack characteristics into a reference data structure.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments illustrated herein implement a new cloud view detection approach for physical machine and virtual machine brute force attacks. In one practical application, embodiments are particularly useful for cloud providers, which have the unique characteristic of having availability of data from a number of different entities. That is, a cloud provider has the ability to access data from all machines and tenants in the cloud service, enabling a broad cloud view to fuse individual virtual machine security logs with overall network traffic topology mapping, to detect attacks that might otherwise be undetectable if only individual machine logs, or only network traffic were available.

Figure 1:
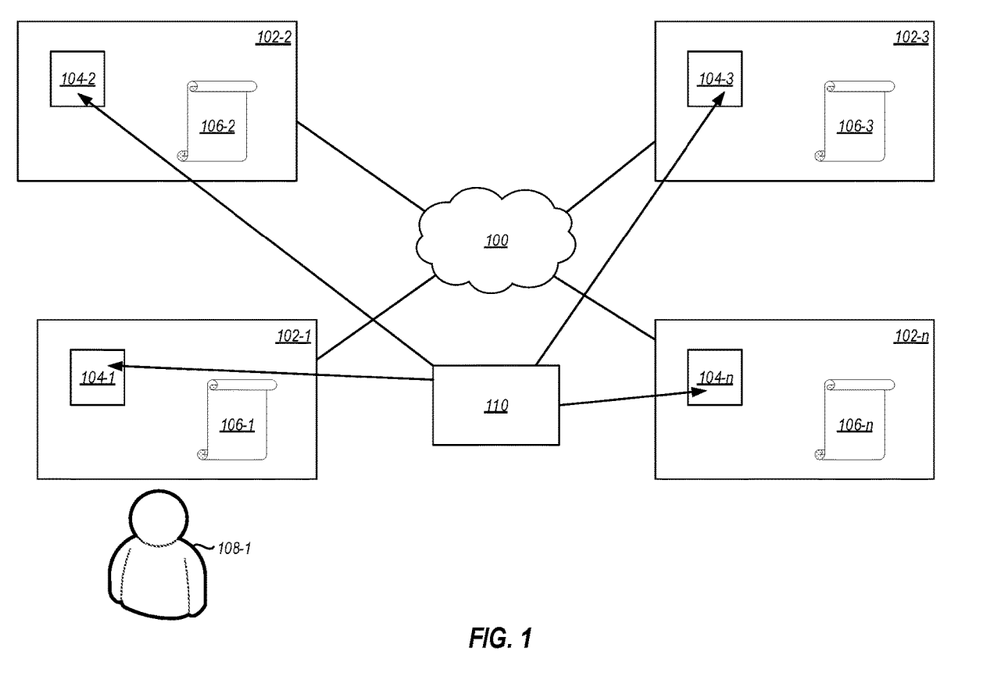
FIG. 1 illustrates an overview schematic diagram for use in accordance with one or more embodiments.

Referring now to FIG. 1, an example is illustrated. FIG. 1 illustrates a cloud service 100. The cloud service 100 provides computing functionality to various customers of the cloud service 100. In particular, customers of the cloud service 100 are typically implemented as tenants of the cloud service 100. A given tenant will "rent" one or more virtual machines from the cloud service 100. In particular, the cloud service 100 can pool various resources such as computer resources, storage resources (including memory and mass storage), network resources, software resources, or virtually any other computing resource that a customer may desire to use. The cloud service can instantiate various virtual machines, which are partitioned computing entities having certain at least portions of (by time or space sharing) physical processors, physical memory, physical storage, physical networking hardware, etc. allocated to implement the virtual machines. The virtual machines can then be provided to the tenants of the cloud service 100 allowing the tenants to use computing resources as agreed upon by the tenants and the cloud service 100. Thus for example, the cloud service 100 may be Azure services available from Microsoft Corporation, of Redmond, Wash.

FIG. 1 illustrates a number of tenants of the cloud service 100. In particular, FIG. 1 illustrates a tenant 102-1, a tenant 102-2, a tenant 102-3, through tenant 102-n. The ellipses illustrated between tenant 102-3 and 102-n represents the fact that a variable number of tenants may be implemented at the cloud service 100. Indeed, one of the benefits of cloud services is the ability to add and remove tenants as needed along with adding and removing computer resources, storage, network hardware, software, etc., as appropriate to the cloud service 100.

In the example illustrated in FIG. 1, each of the tenants includes a virtual machine allocated to the tenant. Thus, in the example illustrated in FIG. 1, tenant 102-1 has a virtual machine 104-1 allocated to it. Similarly, tenant 102-2 has a virtual machine 104-2 allocated to it, tenant 102-3 has a virtual machine 104-3 allocated to it, and tenant 102-n has a virtual machine 104-n allocated to it. While the example illustrates that a single virtual machine has been allocated to each tenant, this is simply for convenience of illustration, and it should be appreciated that in other embodiments different numbers of virtual machines can be allocated to different tenants.

Note that each virtual machine has associated with it a log. Thus for example, virtual machine 104-1 is associated with log 106-1, virtual machine 104-2 is associated with log 106-2, virtual machine 104-3 is associated with log 106-3, and virtual machine 104-n is associated with log 106-n. A given log for a virtual machine logs various significant activities that occur with respect to the virtual machine. For example, the log may record access attempts, logon attempts, successful logons, log off events, or other pertinent information for the virtual machine. Typically, the log will associate this information with the IP addresses of entities attempting the access attempts and record it in the log data.

Note that each tenant is typically associated with an entity such as a company, individual, or other entity. A given entity associated with a tenant will typically have access to data generated for that specific tenant. Thus, for example, FIG. 1 illustrates an administrator 108-1 that is able to access the log data in the log 106-1. Thus, to the extent that the administrator 108-1 can examine the data in the log 106-1 and identify attacks on the virtual machine 104-1, such attacks can be thwarted by the entity associated with the tenant itself.

However, as noted above, often attacks by attackers are infrequent with respect to a particular entity and/or tenant. Thus for example, FIG. 1 illustrates an attacker 110. Because the attacker 110 is a prolific attacker attacking many virtual machines in the cloud service 100, the attacker will have relatively few attacks with respect to any given individual tenant. Thus, in the example illustrated in FIG. 1, the attacker 110 is shown attacking virtual machines in each of the tenants a single time. Thus, the attacker is shown performing four attacks, but each individual tenant only sees a single attack.

In situations such as this, typically a tenant will see this as white noise. Indeed, in some embodiments, because the attacker only attempts a single attack, if the attack is successful, the attack may appear to the administrator 108-1 as an ordinary and expected logon of an authorized user of the virtual machine 104-1. In particular, the log 106-1 will only illustrate a single attempt to access the virtual machine 104-1, and that the attempt was successful granting access to the attacker 110. If the log 106-1 recorded multiple attempts by the attacker 110 to access the virtual machine 104-1, then the administrator 108-1 would be able to identify that the attacker 110 was attempting a brute force attack of the virtual machine 104-1. However, given the nature of the attack shown in FIG. 1, this would typically not be detectable by the administrator 108-1.

Note that the cloud service 100 has access to network data in the cloud service 100. Thus, the cloud service 100 can see all of the network data of the attacker 110 attempting accesses to the various virtual machines in the cloud service 100. In particular, the cloud service 100 is often able to collect and/or access network traffic protocol monitoring data for all data in the cloud service 100. Network traffic protocol monitoring data is often gathered using IPFIX protocols (IPFIX protocol data), Netflow protocols (Netflow protocol data), or other network monitoring protocols. These protocols can be used to characterize network data and traffic. For example, the protocols may identify when certain traffic occurs, the source IP address of certain traffic, the port used for certain traffic, the destination IP address of certain traffic, the destination port of certain traffic, number of packets of certain traffic, packet size of certain traffic, various flags for certain traffic, packet type of certain traffic, etc.

By collecting this network traffic data for multiple tenants in the cloud service 100, the cloud service 100 can identify attacks that are not identifiable by individual tenants. For example, in the running example illustrated in FIG. 1, the cloud service 100 can analyze the network traffic data to identify that an IP address associated with the attacker is sending multiple logon requests in a brute force fashion to multiple different virtual machines in the cloud service 100, even though only a low number of logon requests (perhaps, even just a single logon request) are sent to any given virtual machine. Thus, the cloud service 100 can recognize an attack by the attacker 110, that is not detectable by any given tenant.

Note that the cloud service 100 also has access to all of the logs 106-1 through 106-n. The cloud service 100 can identify instances in the log data in those logs where logon attempts by the attacker 110 were successful. Thus, while an individual tenant would not be able to identify that a successful attack had been made on a virtual machine, the cloud service 100 could identify an attacker 110 and also identify that the attacker 110 had successfully logged on to a given virtual machine associated with the given tenant. Thus, for example, the cloud service 100 may determine that the attacker 110 is attempting to perform a brute force attack on the various virtual machines in the cloud service 100. Therefore, the cloud service 100 can classify the attacker 110 as a nefarious entity that should not be granted access to resources of the cloud service 100. Additionally, the cloud service 100 may be able to examine the log 106-1 and determine that the attacker 110 was able to successfully log on to the virtual machine 104-1. The cloud service 100 can issue an alert to the tenant 102-1 indicating that a known attacker 110 was successful in logging on to the virtual machine 104-1 associated with the tenant 102-1. A tenant entity, such as the administrator 108-1, can then take whatever corrective action is appropriate to deny access to the virtual machine 104-1 to the attacker 110.

For example, the tenant 102-1 can block traffic from the attacker 110, blacklist the attacker 110, change access credentials of the virtual machine 104-1, or other appropriate actions for ensuring that the attacker 110 and/or other unauthorized entities are once again unable to access the virtual machine 104-1.

Figure 2:
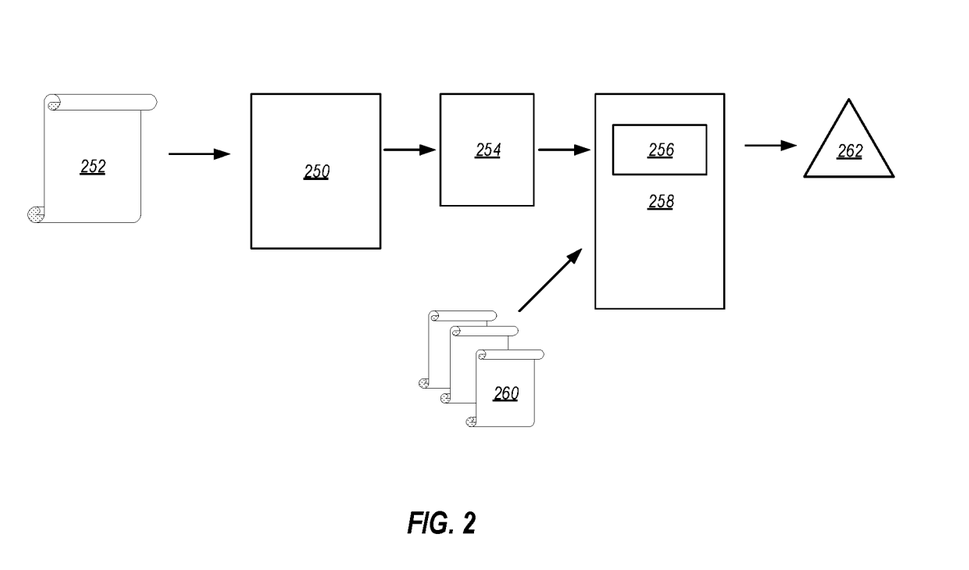
FIG. 2 illustrates a schematic diagram of for use in accordance with one or more embodiments.

Attention is now directed to FIG. 2 which illustrates additional details of a functional embodiment that may be implemented by the cloud service 100. In particular, FIG. 2 illustrates that the cloud service implements a classifier 250. The classifier may be various computer hardware, software, and other elements that are configured to implement a system of classifying network traffic data input into the classifier 250. In particular, classifier 250 receives as input the network traffic data 252. The network traffic data 252 is collected using the network traffic protocol monitoring protocols described previously. Thus, the network traffic data 252 may include various IP addresses (source and destination), ports (source and destination), traffic types, packet sizes, numbers of packets, etc. The classifier 250 can use the network traffic data 252 to identify anomalous behavior characteristics to identify potential attacks in the cloud service 100.

In some embodiments, the classifier 250 includes various machine learning tools and/or other classification tools to extract the anomalous behavior characteristics 254. For example, the classifier 250 may use clustering techniques, trained models, classifiers, labeled data, unlabeled data, collaborative filters, or other tools to extract anomalous behavior characteristics 254 from the network traffic data 252. In particular, embodiments can create enumerations of suspicious volumetric scale brute force behaviors of IP addresses. Embodiments can also correlate IP addresses with suspicious patterns, known attack campaigns, etc. For example, as illustrated in FIG. 2, a reference data structure 256 is created that correlates IP addresses to suspicious patterns, known attack campaigns, and/or other information indicating that an IP address is associated with a brute force attack.

This reference data structure 256 is included in, or at least accessible to a successful attack detector 258. The successful attack detector 258 includes computing hardware, software, and/or the like, that is able to receive log data 260. The log data 260 may include the various logs 106-1 through 106-*n* illustrated in FIG. 1. The information in the log data 260 can be compared with the reference data structure 256 in the successful attack detector 258 to identify when accesses to given virtual machines were successful, and when those accesses were performed by entities associated with IP addresses of attackers stored in the reference data structure 256. In this way the successful attack detector 258 is able to identify that an attacker (e.g. attacker 110) was able to successfully gain access to a virtual machine (e.g. virtual machine 104-1). The successful attack detector can then issue an alert 262 to a tenant (e.g. tenant 102-1) indicating to the tenant that a successful attack occurred on the virtual machine associated with the tenant and that the tenant should take corrective actions as a result.

Note that in some embodiments, the reference data structure 256 and/or data from the reference data structure 256 may be provided to the various tenants of the cloud service 100 prior to a successful attack being accomplished. For example, the cloud service 100 can provide information from the reference data structure 256 to various tenants where the tenants can store the information on their particular virtual machines, such that when the attacker 110 attempts to logon, the information will already be known to the virtual machines, and the virtual machines can deny any requests from the attacker 110.

Illustrating now additional details, an attack can be modeled based on various dimensions. For example, an attack may be modeled based on one or more of the following dimensions:

Number of targeted machines (single vs. multiple);
Number of attacker machines (single vs. multiple);
Attack Frequency (low & slow vs. burst);
Prior knowledge about the target (none vs. partial);
Location source of attack traffic;
Traffic type;
TCP flags;
Etc.

Each dimension gives different perspective and their intersection allow embodiments to model most of the attack scenarios. In particular, in some embodiments the classifier 250 is able to model attack scenarios, which can be used to generate the anomalous behavior characteristics 254.

As noted previously, embodiments can use machine learning over the IPFIX network data, or other network traffic protocol monitoring data, to cluster or otherwise map suspicious sources on a cloud network and fuse them with virtual machine connections logs. The fusion process above enables detection of more sophisticated and delicate attacks, giving a stronger confidence on the attacker sources, which is not simply based on the number of logon tries attempted against a particular virtual machine.

For example, in the scenario of low and slow attacks against multiple targeted machines, the amount of logon tries on a single machine is minimal and almost undetectable. But with the use of a more general, total cloud view, embodiments are able to detect attacker sources as malicious.

In addition, looking at cloud network level, embodiments can notify tenant customers of potential IP addresses that are part of an attacker cluster even before they reach the tenant machine. This allows the tenant customer to block these IP addresses and prevent future brute force attacks. Although this form of attack has been around for many years, it remains one of the most popular and widely used password-cracking methods.

In terms of impact, brute force attacks are a threat capable of affecting millions of accounts. If these attacks are not detected and addressed in a timely manner they can lead to theft of intellectual property and personally identifiable information, significant financial losses, and irreversible damage to a business's reputation.

Since most of cloud-hosted virtual machines require SSH/RDP login accesses, such attacks are a major security concern for Azure users.

Most of detections use specific log machine or sampled network, but do not fuse and see cloud scale view of the attack to detect the more delicate campaigns and attacks. The invention leverages cloud provider network and machine log wide view, to detect and protect attacks affected not a single machine but a whole cloud attack scale.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 3:
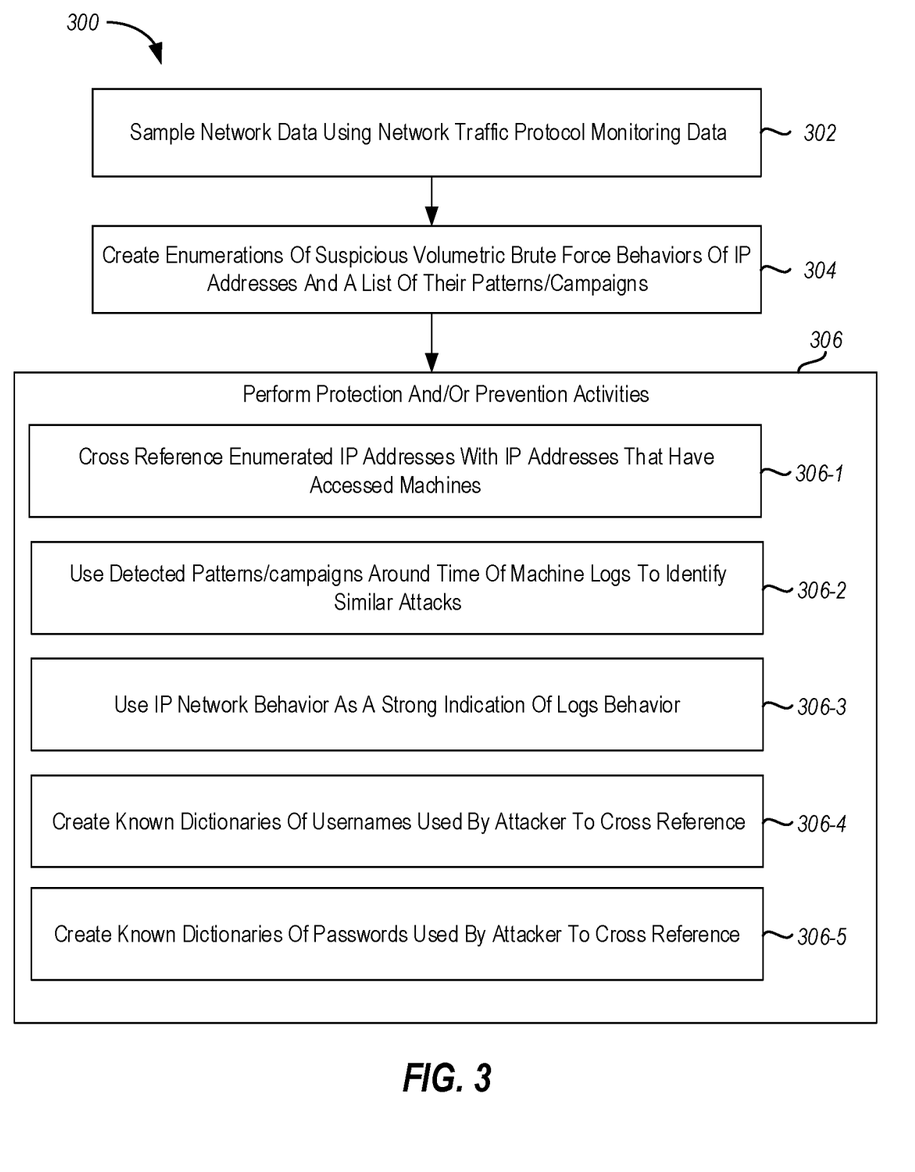
FIG. 3 illustrates a flowchart of a method in accordance with an embodiment for protecting against brute force attacks.

Referring now to FIG. 3, a method 300 is illustrated. The method 300 includes various acts for protecting against brute force attacks.

As illustrated at 302, the method 300 includes sampling network data using network traffic protocol monitoring data. For example, embodiments may use IPFIX protocol data, Netflow protocol data, or other network traffic protocol monitoring data, or other network flow monitoring technology data. This allows a cloud service to collect information such as source IP addresses, source ports, destination IP addresses, destination ports, numbers of packets, sizes of packets, type of protocol (e.g. UDP, TCP, etc.), type of service (i.e. priority), etc.

As illustrated at 304, the method 300 further includes creating enumerations of suspicious volumetric scale brute force behaviors of IP addresses and a list of their patterns and/or campaigns. For example, embodiments may be configured to identify when entities associated with certain IP addresses are used in a fashion that would indicate that they are attackers. This can be done, for example, by evaluating patterns of behavior, known actions typically associated with attacks, etc. As discussed previously, much of this evaluation can be accomplished by using various machine learning techniques to classify the behavior.

In some embodiments, act 304 may further include correlating the IP addresses with behaviors that are indicative of a brute force attack. Indeed, in some embodiments, particular IP addresses may be correlated with known brute force attack campaigns. For example, often a brute force attack campaign will be implemented using available software routines specifically implemented for such purposes. Wide-ranging attack, and/or multiple of different attacks by different entities using the software routines can be correlated as belonging to the same or similar campaign. The cloud system can then correlate IP addresses with similar campaigns and/or particular software routines.

The IP addresses may be correlated with behaviors, patterns, and/or campaigns in a number of different fashions. For example, in some embodiments data structures such as databases, flat files, tables, and/or other means may be used to collect and store the correlation as a data structure for later use in detecting and/or preventing brute force attacks.

Note that various alternatives may be implemented for updating relations of IP addresses with behaviors, patterns and/or campaigns. For example, in some embodiments, a structure may be updated as new IP addresses, behaviors, patterns, and/or campaigns are identified. Alternatively, embodiments may be able to provide reasonably effective protection by performing updates to the data store on a daily, hourly, or other periodic basis according to some predetermined period of update.

Returning once again to FIG. 3, protection and and/or prevention activities are performed based on the enumerations of suspicious volumetric brute force behaviors of entities associated with IP addresses and the listing of patterns and/or campaigns as illustrated at 306.

For example, as illustrated at 306-1, embodiments may cross reference enumerated IP addresses with IP addresses that accessed machines to see if entities associated with the IP addresses have successfully logged in to the machines or attempted access to the machines. In particular, embodiments may access logs for the various machines to identify successful logons to the machines by certain entities associated with certain known IP addresses associated with attacker entities. Embodiments can then determine whether or not IP addresses associated with attacker entities were successful in logging on to machines in the cloud service.

Alternatively, or additionally, as illustrated at 306-2, embodiments can use detected patterns and/or campaigns around the time indicated in a machine log to see if similar attack have been attempted on other machines.

Alternatively, or additionally, as illustrated at 306-3, embodiments can use IP network behavior as a strong indication to logs behavior.

Alternatively, or additionally, as illustrated at 306-4, embodiments can create known dictionaries of usernames used by an attacker to cross reference on different machines. Examples of this functionality are illustrated in more detail below.

Alternatively, or additionally, as illustrated at 306-4, embodiments can create known dictionaries of passwords used by an attacker to cross reference on different machines. Examples of this functionality are illustrated in more detail below.

Figure 4:
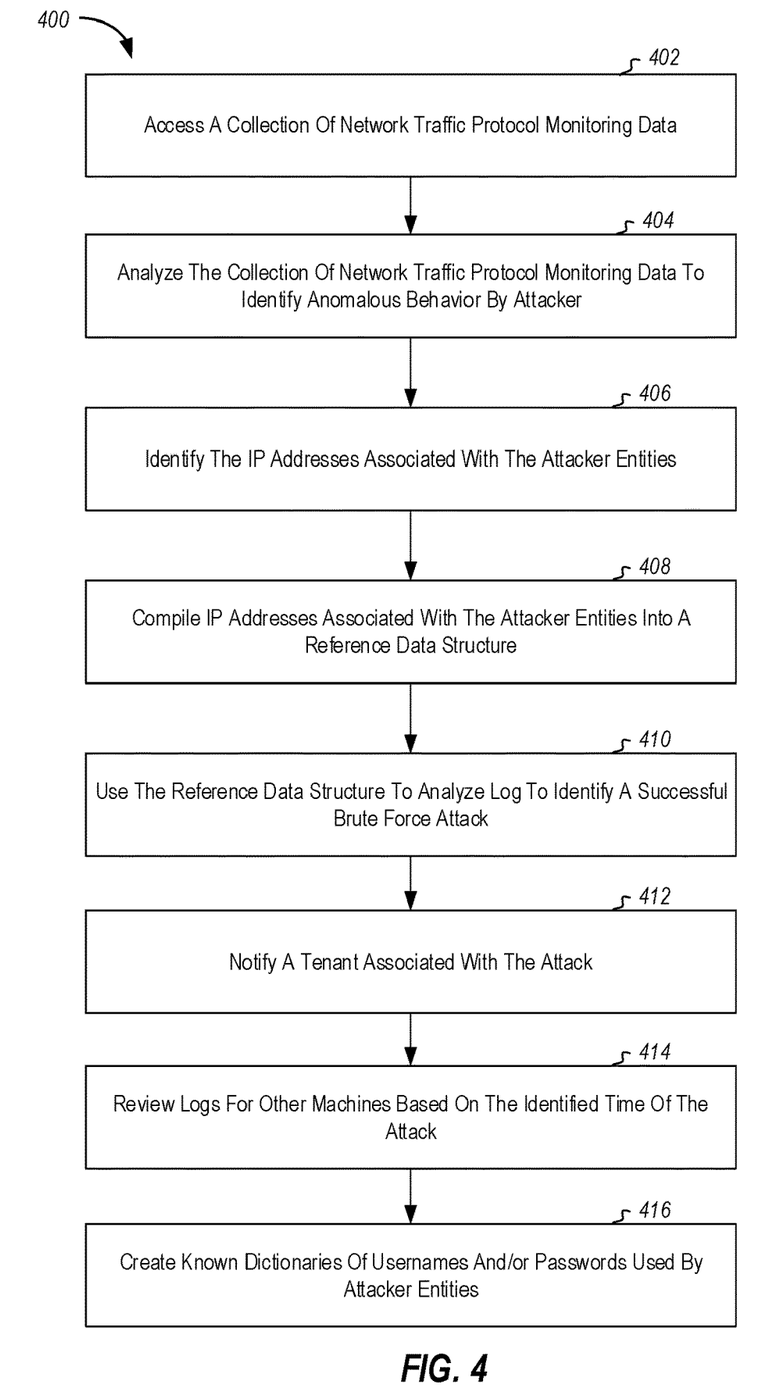
FIG. 4 illustrates a flowchart of a method in accordance with an embodiment for protecting against virtual machine logon attacks within a cloud service.

Referring now to FIG. 4, another method 400 is illustrated. The method 400 includes various acts for detecting machine logon attacks within a cloud service.

As illustrated at 402, the method 400 includes accessing a collection of network traffic protocol monitoring data, the network traffic protocol monitoring data comprising network traffic protocol monitoring data across the cloud service. For example, network traffic protocol monitoring data, such as IPFIX protocol data, may be collected for all cloud tenants in a cloud system. In particular, this type of network traffic protocol monitoring data provides a very detailed collection of information about most, if not all significant traffic occurring in the cloud system. Embodiments can collect the network traffic protocol monitoring data in a number of different ways. For example, in some embodiments, the network traffic protocol monitoring data may be collected by hardware specifically including functionality built into the hardware. Indeed, many network hardware manufacturers include such functionality in switches and routers intended to be used in networking environments. Cloud services using such hardware can make use of the hardware to collect the network traffic protocol monitoring data. Alternatively, or additionally, the cloud service may use existing computer hardware and/or executable instructions to implement cloud service specific network traffic protocol monitoring data collection systems.

As illustrated at 404, the method 400 further includes analyzing the collection of network traffic protocol monitoring data to identify anomalous behavior by attacker entities associated with IP addresses indicating a brute force attack by the attacker entities associated with the IP addresses. For example, as discussed previously, various pattern detection systems, machine learning systems, and/or other systems can be used to identify behavior by entities that appears to be associated with brute force attacks. As the network traffic protocol monitoring data includes IP addresses, embodiments can collect the IP addresses, along with identifying anomalous behavior attributable to attacker entities associated with the IP addresses to compile and/or generate information useful for detecting and/or preventing brute force attacks by attacker entities associated with the collected IP addresses.

Thus, based on the anomalous behavior, the method 400 further includes identifying the IP addresses associated with the attacker entities, and at least one of attack pattern or campaign attack characteristics, as illustrated at 406. The attack patterns and campaign attack characteristics can include when certain traffic occurs, the source IP address of certain traffic, the port used for certain traffic, the destination IP address of certain traffic, the destination port of certain traffic, number of packets of certain traffic, packet size of certain traffic, various flags for certain traffic, packet type of certain traffic, etc. Additionally, or alternatively, the attack patterns and campaign attack characteristics can include the dimensions that were previous identified as being those by which attacks can be modeled.

As illustrated at 408, the method 400 further includes compiling IP addresses associated with the attacker entities and the at least one of attack patterns or campaign attack characteristics into a reference data structure. For example, as illustrated previously with respect to FIG. 2, a reference data structure 256 may be populated with IP addresses associated with attacker entities along with patterns or campaign attack characteristics such that entities can be associated with specific attack details.

As illustrated at 410, the method 400 further includes using the reference data structure, analyzing a particular log for a particular machine of a tenant in the cloud service to identify a successful brute force attack on the particular virtual machine. For example, as illustrated in FIG. 1, cloud service 100 can analyze the log 106-1 of machine 104-1 to identify an entity enumerated in the reference data structure was successful in logging in to the virtual machine 104-1. In some embodiments, this may be performed by simply comparing any IP address the log 106-1 to the IP addresses included in the reference data structure to attempt to identify whether or not an attacker entity was successful in accessing the virtual machine 104-1. In particular, the log 106-1 will include an enumeration of the addresses as well as activities associated with those IP addresses, including whether or not those activities were successful. Thus, the log will include an enumeration of IP addresses that were used by entities to successfully logon to the virtual machine 104-1, as well as an indication that the entity was successful in logging into the virtual machine 104-1. This way, the cloud service 100 can identify when attacker entities were successful logging into a particular virtual machine 104-1.

As a result, the method 400 further includes notifying the tenant associated with the machine of the attack, as illustrated at 412. For example, in the example illustrated in FIG. 1, an alert such as the alert 262 illustrated in FIG. 2 may be provided to the tenant 102-1 to indicate to the tenant 102-1 that a successful attack by an attacker entity, such as the attacker 110, was performed on the virtual machine 104-1. Tenant 102-1 can take appropriate action as discussed previously herein.

The method 400 may be practiced where the network traffic protocol monitoring data comprises IPFIX protocol data. As noted previously various types of network traffic protocol monitoring data can be used including IPFIX protocol data, Netflow protocol data, or other network traffic protocol monitoring data.

As illustrated at 414, the method 400 may further include reviewing logs for other machines based on the identified time of the brute force attack. For example, the time when the successful brute force attack occurred can be identified. A time window may be the order of milliseconds, seconds, minutes, hours, or any other appropriate time measurement. The cloud service can then perform an abbreviated analysis of the logs for other machines focusing on the time window to attempt to identify if the brute force attack was attempted on the other machines. For example, with reference to FIG. 1, by identifying that an attack (successful or otherwise) occurred on the virtual machine 104-1, at a particular time, cloud service 100 could examine the logs 106-2 through 106-*n* within the correlated time window to attempt to determine if attacks were attempted against those corresponding machines 104-2 through 104-*n*, at the same or similar (i.e., within the time window). Using this process, embodiments may be able to identify portions of the logs that have a higher probability of indicating a brute force attack against a particular virtual machine. However, this can be used as part of a broader strategy directed to analyzing additional portions of logs. In particular, logs may be analyzed in an ordered fashion where portions of the logs that are more likely to include data indicating a brute force attack are examined before other portions that are less likely to include data indicating a brute force attack. In this fashion, computing resources and be directed first to higher priority portions of the logs. Other portions would still be analyzed, but could be analyzed in a less high-priority fashion.

As illustrated at 416, the method 400 may further include using the reference data structure, analyzing logs for a plurality of machine for a plurality of different tenant in the cloud service to identify usernames and/or passwords used by attacker entities in attempting brute force attacks, and creating a dictionary of the usernames and/or passwords. In particular, the logs will contain information identifying usernames and/or passwords used in logon attempts. Using the IP addresses from the reference data structure correlated to attacker entities, logs could be analyzed to extract usernames and passwords used by those attacker entities in attempting to logon to various machines in the cloud service. Those usernames and/or passwords could be collected and stored in various dictionaries. The dictionaries could be used for various purposes, such as for example notifying tenants of the cloud service generally, notifying particular tenants when usernames and/or passwords are relevant to particular tenants, or for other purposes. For example, in some embodiments, the dictionaries of usernames and/or passwords can be used to identify trajectories of an attack. In particular, embodiments may include functionality for analyzing how usernames and/or passwords are changed in various iterations of an attack.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

In its most basic configuration, a computer system includes various different components. For example a computer system includes at least one processor (aka a "hardware processing unit") and storage.

The storage may include computer-executable instructions in the form of code. Storage may be physical system memory, which may be volatile, non-volatile, or some combination of the two. The term "memory" may also be used herein to refer to non-volatile mass storage such as physical storage media. If a computer system is distributed, the processing, memory, and/or storage capability may be distributed as well.

As used herein, the term "executable module," "executable component," "engine," "model," or even "component" can refer to software objects, routines, or methods that may be executed on the computer system. The different components, models, modules, engines, and services described herein may be implemented as objects or processors that execute on the computer system (e.g. as separate threads). It will be appreciated that engines, modules, models, or components may be a combination of one or more processors and executable instructions that cause the processor(s) to perform specialized functions, such as those described throughout this disclosure and in particular with relation to each individual method act described above.

In other instances, the components, modules, models, or engines may simply be executable instructions that are executable by any type of processor. In yet other instances, the components, modules, models, or engines, may be in the form of ASICs or even system-on-chip ("SOC") devices specially configured to perform any individual operation (e.g., any one act included in the methods above) or to perform multiple operations (e.g., any combination of the method described above). In this regard, a component, module, model, or engine can be thought of as a hardware processing unit, a compilation of executable code, or combinations of the above that enable a computer system to perform specialized operations.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, additionally, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of detecting machine logon attacks within a cloud service, the method comprising:
accessing a collection of network traffic protocol monitoring data, the network traffic protocol monitoring data comprising network traffic protocol monitoring data across the cloud service, including data from different tenants of the cloud service;
analyzing the collection of network traffic protocol monitoring data to identify anomalous behavior by attacker entities associated with IP addresses indicating a brute force attack by the attacker entities associated with the IP addresses including:
analyzing logs for a plurality of machines for a plurality of the different tenants in the cloud service to identify usernames or passwords used by the attacker entities in attempting brute force attacks; and
identifying at least one brute force attack trajectory based on the identified usernames or passwords;
based on the anomalous behavior, identifying the IP addresses associated with the attacker entities, and at least one of attack patterns or campaign attack characteristics;
compiling IP addresses associated with the attacker entities and the at least one of attack patterns or campaign attack characteristics into a reference data structure; and
as a result, preventing one or more of the attacker entities from accessing resources of the cloud service.

2. The method of claim 1, further comprising:
using the reference data structure, analyzing a particular log for a particular machine of a tenant in the cloud service to identify the brute force attack on the particular machine; and
as a result, notifying the tenant associated with the particular machine targeted by the brute force attack.

3. The method of claim 1, wherein the network traffic protocol monitoring data comprises IPFIX protocol data.

4. The method of claim 1, further comprising, as a result of identifying the successful brute force attack:
identifying a time when the brute force attack occurred; and
using the identified time, performing an abbreviated review of logs for other machines for other tenants to attempt to identify the brute force attack being attempted on other machines.

5. The method of claim 1, further comprising modeling the at least one brute force attack trajectory to identify at least one machine that is at risk of a future brute force attack.

6. The method of claim 1, wherein the IP addresses associated with the attacker entities, and at least one of attack patterns or campaign attack characteristics are identified using a clustering technique.

7. The method of claim 1, wherein the IP addresses associated with the attacker entities, and at least one of attack patterns or campaign attack characteristics are identified using a trained model.

8. The method of claim 1, wherein the at least one attack patterns or campaign attack characteristics include at least one of the following:
- a number of machines targeted by the brute force attack;
- a number of machines used in the brute force attack;
- a frequency associated with the brute force attack; and
- a location of a source of the brute force attack.

9. A computer system for protecting against virtual machine logon attacks within a cloud service, comprising:
- one or more hardware processors; and
- one or more computer-readable media having stored thereon instructions that are executable by the one or more processors to configure the computer system to detect a virtual machine logon attack within the cloud service, including instructions that are executable to configure the computer system to perform at least the following:
  - access a collection of network traffic protocol monitoring data, the network traffic protocol monitoring data comprising network traffic protocol monitoring data across the cloud service, including data from different tenants of the cloud service;
  - analyze the collection of network traffic protocol monitoring data to identify anomalous behavior by attacker entities associated with IP addresses indicating a brute force attack by the attacker entities associated with the IP addresses including:
    - analyzing logs for a plurality of machines for a plurality of the different tenants in the cloud service to identify usernames or passwords used by the attacker entities in attempting brute force attacks; and
    - identifying at least one brute force attack trajectory based on the identified usernames or passwords;
  - based on the anomalous behavior, identify the IP addresses associated with the attacker entities, and at least one of attack patterns or campaign attack characteristics;
  - compile IP addresses associated with the attacker entities and the at least one of attack patterns or campaign attack characteristics into a reference data structure; and
  - as a result, prevent one or more of the attacker entities from accessing resources of the cloud service.

10. The computer system of claim 8, wherein one or more computer-readable media further have stored thereon instructions that are executable by the one or more processors to configure the computer system to perform at least the following:
- using the reference data structure, analyze a particular log for a particular machine of a tenant in the cloud service to identify the brute force attack on the particular machine; and
- as a result, notify the tenant associated with the particular machine targeted by the brute force attack.

11. The computer system of claim 9, wherein the network traffic protocol monitoring data comprises IPFIX protocol data.

12. The computer system of claim 9, wherein one or more computer-readable media further have stored thereon instructions that are executable by the one or more processors to configure the computer system to perform at least the following:
- identify a time when the brute force attack occurred; and
- using the identified time, perform an abbreviated review of logs for other machines for other tenants to attempt to identify the brute force attack being attempted on other machines.

13. The computer system of claim 9, wherein one or more computer-readable media further have stored thereon instructions that are executable by the one or more processors to configure the computer system to model the at least one brute force attack trajectory to identify at least one machine that is at risk of a future brute force attack.

14. A computer program product comprising one or more physical computer storage media having stored thereon computer-executable instructions that, when executed at a processor, cause a computer system to detect machine logon attacks within a cloud service, including:
- accessing a collection of network traffic protocol monitoring data, the network traffic protocol monitoring data comprising network traffic protocol monitoring data across the cloud service, including data from different tenants of the cloud service;
- analyzing the collection of network traffic protocol monitoring data to identify anomalous behavior by attacker entities associated with IP addresses indicating a brute force attack by the attacker entities associated with the IP addresses including:
  - analyzing logs for a plurality of machines for a plurality of the different tenants in the cloud service to identify usernames or passwords used by the attacker entities in attempting brute force attacks; and
  - identifying at least one brute force attack trajectory based on the identified usernames or passwords;
- based on the anomalous behavior, identifying the IP addresses associated with the attacker entities, and at least one of attack patterns or campaign attack characteristics;
- compiling IP addresses associated with the attacker entities and the at least one of attack patterns or campaign attack characteristics into a reference data structure; and
- as a result, preventing one or more of the attacker entities from accessing resources of the cloud service.

15. The computer program product of claim 14, the one or more physical computer storage media having stored thereon computer-executable instructions that, when executed at the processor, cause the computer system to perform at least the following:
- using the reference data structure, analyze a particular log for a particular machine of a tenant in the cloud service to identify the brute force attack on the particular machine; and
- as a result, notify the tenant associated with the particular machine targeted by the brute force attack.

16. The computer program product of claim 14, wherein the network traffic protocol monitoring data comprises IPFIX protocol data.

17. The computer program product of claim 14, the one or more physical computer storage media having stored thereon computer-executable instructions that, when executed at the processor, cause the computer system to perform at least the following:

identify a time when the brute force attack occurred; and     using the identified time, perform an abbreviated review of logs for other machines for other tenants to attempt to identify the brute force attack being attempted on other machines.

18. The computer program product of claim 14, the one or more physical computer storage media having stored thereon computer-executable instructions that, when executed at the processor, cause the computer system to model the at least one brute force attack trajectory to identify at least one machine that is at risk of a future brute force attack.

19. The computer program product of claim 14, wherein the IP addresses associated with the attacker entities, and at least one of attack patterns or campaign attack characteristics are identified using a clustering technique.

20. The computer program product of claim 14, wherein the IP addresses associated with the attacker entities, and at least one of attack patterns or campaign attack characteristics are identified using a trained model.

\* \* \* \* \*